US012728505B2

(12) United States Patent
Cheveralls et al.

(10) Patent No.: US 12,728,505 B2
(45) Date of Patent: Sep. 8, 2026

(54) RATCHET TOOL

(71) Applicants: Daniel Cheveralls, Raleigh, NC (US); Peter Nguyen, Euless, TX (US); Bennett G. Records, Branford, CT (US)

(72) Inventors: Daniel Cheveralls, Raleigh, NC (US); Peter Nguyen, Euless, TX (US); Bennett G. Records, Branford, CT (US)

(73) Assignee: BLACK & DECKER INC., New Britain, CT (US)

( * ) Notice: Subject to any disclaimer, the term of this patent is extended or adjusted under 35 U.S.C. 154(b) by 631 days.

(21) Appl. No.: 18/182,098

(22) Filed: Mar. 10, 2023

(65) Prior Publication Data

US 2024/0300075 A1 Sep. 12, 2024

(51) Int. Cl.
*B25B 13/46* (2006.01)

(52) U.S. Cl.
CPC .................................. *B25B 13/463* (2013.01)

(58) Field of Classification Search
CPC .................................................... B25B 13/463
USPC ...................................................... 81/60–63.2
See application file for complete search history.

(56) References Cited

U.S. PATENT DOCUMENTS

| | | | | |
|---|---|---|---|---|
| 6,959,626 B1 * | 11/2005 | Shen | B25B 13/463 81/63 |
| 9,457,456 B2 * | 10/2016 | Chen | B25B 13/463 |
| 10,335,929 B2 * | 7/2019 | Chou | B25B 13/465 |
| 2018/0339403 A1 * | 11/2018 | Chen | B25B 13/463 |

* cited by examiner

*Primary Examiner* — Hadi Shakeri
(74) *Attorney, Agent, or Firm* — Jordan IP Law, LLC; Todd A. Vaughn

(57) ABSTRACT

One or more embodiments of the present disclosure relate generally to a ratchet tool including a ratchet head having a drive gear, a pawl, and a spring plunger system that applies an even and consistent distribution of loading to the pawl at a contact interface between the pawl and the drive gear during a ratcheting operation.

18 Claims, 16 Drawing Sheets

RATCHET TOOL

TECHNICAL FIELD

One or more embodiments of the present disclosure relate generally to a ratchet tool including a ratchet head having a drive gear, a pawl, and a spring plunger system that applies an even and consistent distribution of loading to the pawl at a contact interface between the pawl and the drive gear during a ratcheting operation.

BACKGROUND

A ratchet tool or ratchet wrench allows a user to fasten and remove various types of mechanical fasteners such as bolts, nuts, and the like, especially in areas that are not easily accessible.

Some ratchet tool configurations include a ratchet head, a drive member such as a rotatable gear having a plurality of external gear teeth, and a pawl having a plurality of external pawl teeth that engage the external gear teeth under a bias force in order to control the direction of rotation of the gear. One or more bias members comprising springs, are received in a retaining mechanism that maintains the springs in position.

The pawl, received in a pawl pocket defined by a peripheral wall of the ratchet head, has a thin structural profile or configuration that reduces the operating life of the ratchet tool. The structural profile of the pawl also includes a curvilinear outer wall that causes undesirable radial movement of the pawl in the pawl pocket during a ratcheting operation. Such radial movement is caused by engagement of the curved outer sidewall of the pawl with a peripheral wall of the ratchet head during a ratchet operation. The radial movement of the pawl also causes disengagement of the external pawl teeth with the external gear teeth. This action, in turn, adversely effects the performance of the ratchet tool, and reduces the operational life of the ratchet tool.

At some point in time the grip becomes worn and its effectiveness is reduced after repeated use of the ratchet tool. This is due to the frictional forces between the grip and the hand of the user during a ratcheting operation. Once the grip becomes worn and largely ineffective, a user may purchase an entirely new ratchet tool, or use various tools, which takes considerable time and effort. This can become costly to the user.

SUMMARY

In accordance with one or more example embodiments, a ratchet tool comprises a drive assembly that includes a pawl, a switch lever, bias members, and a plunger assembly that enables a user to apply sufficient torque when performing ratcheting operation to quickly and efficiently fasten and/or remove a mechanical fastener. The ratchet tool also comprises a removeable and interchangeable grip that enables the ratchet tool to be field-serviceable for damage repair or customization by quickly replacing the grip with another suitable grip once the grip has become worn.

In accordance with one or more example embodiments, a ratchet tool comprises one or more of the following: a ratchet head having a front surface defining a first region and a second region; a drive gear mounted on the first region of the ratchet head, the drive gear having external gear teeth; a pawl that includes a pawl body mounted on the second region of the ratchet head, the pawl body having a rear face and a front face with external pawl teeth that operatively engages the external gear teeth; a switch lever including a switch body extending along a longitudinal axis for selective manipulation by a user to change a rotational drive direction of the drive gear, the switch body having an internal space; and a plunger assembly received in the internal space of the switch body, the plunger assembly including a plunger body and a plurality of bias members that includes a first bias member and a second bias member to apply a bias force on the plunger body which transmits an even distribution of the bias force across the width of the rear face of the pawl body to facilitate engagement of the external gear teeth with the external pawl teeth.

In accordance with one or more example embodiments, a ratchet tool comprises one or more of the following: a ratchet head having a front surface defining a first region and a second region; a drive gear mounted on the first region of the ratchet head, the drive gear having external gear teeth; a pawl that includes a pawl body configured on the second region of the ratchet head, the pawl body having at least one surface with external pawl teeth that operatively engages the external gear teeth; a control member extending along an axis for selective manipulation by a user to change a rotational drive direction of the drive gear; and a plunger assembly received by the control member, the plunger assembly including a plunger body and at least one bias member configured to apply a bias force on the plunger body to transmit an even distribution of the bias force across the width of the rear face of the pawl body to facilitate operational engagement of the external gear teeth with the external pawl teeth.

In accordance with the ratchet tool, the control member defines an internal space having at least one pocket that corresponds to the at least one bias member, and a recess having a thickness that corresponds to the thickness of the plunger body.

In accordance with the ratchet tool, the control member comprises a pair of spaced apart wall extensions oriented in a direction that that guides the plunger body in the internal space.

In accordance with the ratchet tool, the plunger body comprises a lower prong received in the recess of the control member.

In accordance with the ratchet tool, the plunger body comprises a cross member and a pair of upper prongs that extend from the cross member, the upper prongs including a first upper prong and a second upper prong spaced apart from the first upper prong.

In accordance with the ratchet tool, the at least one bias member is configured to apply a bias force on at least one of the first upper prong and the second upper prong.

In accordance with the ratchet tool, the rear face includes a rib having a concave cross-section, the rib operable to maintain an alignment of the first upper prong and the second upper prong on the rear face of the pawl body.

In accordance with the ratchet tool, the internal space comprises a first cylindrical pocket that corresponds to the diameter of the first bias member.

In accordance with the ratchet tool, the internal space comprises a second cylindrical pocket that corresponds to the diameter of the second bias member.

In accordance with the ratchet tool, the internal space comprises a recess extending between the first cylindrical pocket and the second cylindrical pocket, the recess having a thickness that corresponds to the thickness of the plunger body.

In accordance with the ratchet tool, the switch body comprises a pair of spaced apart wall extensions that are oriented in a direction that is perpendicular to the longitudinal axis in a manner that guides the plunger body in the internal space.

In accordance with the ratchet tool, the plunger body comprises a lower prong received in the internal space of the switch body.

In accordance with the ratchet tool, the plunger body comprises a pair of upper prongs that extend out of the internal space.

In accordance with the ratchet tool, the upper prongs comprise a first upper prong and a second upper prong spaced apart from the first upper prong.

In accordance with the ratchet tool, the first bias member is operable to apply a bias force on the first upper prong.

In accordance with the ratchet tool, the second bias member is operable to apply a bias force on the second upper prong that is independent of the force applied by the first bias member.

In accordance with the ratchet tool, the rear face includes a rib having a concave cross-section, the rib operable to maintain an alignment of the first upper prong and the second upper prong on the rear face of the pawl body.

In accordance with the ratchet tool, the rib defines a first recessed surface of the rear face that is engaged by the first upper prong.

In accordance with the ratchet tool, the rib defines a second recessed surface of the rear face that is engaged by the second upper prong.

In accordance with the ratchet tool, the pawl body includes a sidewall having a linear outer peripheral surface that engages the ratchet head in a manner that prevents radial movement of the pawl body relative to the ratchet head during a ratcheting operation.

In accordance with the ratchet tool, the linear outer peripheral surface engages the ratchet head in a manner facilitates linear movement of the pawl body relative to the ratchet head to maintain the operational engagement of the external pawl teeth with the external gear teeth during the ratcheting operation.

In accordance with one or more example embodiments, a drive assembly for a ratchet tool comprises one or more of the following: a drive gear having external gear teeth; a pawl that includes a pawl body having a rear face and a front face with external pawl teeth that operatively engages the external gear teeth; a switch lever including a switch body extending along a longitudinal axis for selective manipulation by a user to change a rotational drive direction of the drive gear, the switch body having an internal space; and a plunger assembly received in the internal space of the switch body, the plunger assembly including a plunger body and a plurality of bias members that includes a first bias member and a second bias member to apply a bias force on the plunger body which transmits an even distribution of the bias force across the width of the rear face of the pawl body to facilitate engagement of the external gear teeth with the external pawl teeth.

In accordance with one or more example embodiments, a drive assembly for a ratchet tool comprises one or more of the following: a drive gear having external gear teeth; a pawl that includes a pawl body configured on the second region of the ratchet head, the pawl body having at least one surface with external pawl teeth that operatively engages the external gear teeth; a control member extending along an axis for selective manipulation by a user to change a rotational drive direction of the drive gear; and a plunger assembly received by the control member, the plunger assembly including a plunger body and at least one bias member configured to apply a bias force on the plunger body to transmit an even distribution of the bias force across the width of the rear face of the pawl body to facilitate operational engagement of the external gear teeth with the external pawl teeth.

In accordance with the drive assembly, the control member defines an internal space having at least one pocket that corresponds to the at least one bias member, and a recess having a thickness that corresponds to the thickness of the plunger body.

In accordance with the drive assembly, the control member comprises a pair of spaced apart wall extensions oriented in a direction that that guides the plunger body in the internal space.

In accordance with the drive assembly, the plunger body comprises a lower prong received in the recess of the control member.

In accordance with the drive assembly, the plunger body comprises a cross member and a pair of upper prongs that extend from the cross member, the upper prongs including a first upper prong and a second upper prong spaced apart from the first upper prong.

In accordance with the drive assembly, the internal space comprises a first cylindrical pocket that corresponds to the diameter of the first bias member.

In accordance with the drive assembly, the internal space comprises a second cylindrical pocket that corresponds to the diameter of the second bias member.

In accordance with the drive assembly, the internal space comprises a recess extending between the first cylindrical pocket and the second cylindrical pocket.

In accordance with the drive assembly, the recess has a thickness that corresponds to the thickness of the plunger body.

In accordance with the drive assembly, the switch body comprises a pair of spaced apart wall extensions that are oriented in a direction that is perpendicular to the longitudinal axis in a manner that guides the plunger body in the internal space.

In accordance with the drive assembly, the plunger body comprises a lower prong received in the internal space of the switch body.

In accordance with the drive assembly, the plunger body comprises a pair of upper prongs that extend out of the internal space.

In accordance with the drive assembly, the upper prongs comprise a first upper prong and a second upper prong spaced apart from the first upper prong.

In accordance with the drive assembly, the first bias member is operable to apply a bias force on the first upper prong.

In accordance with the drive assembly, the second bias member is operable to apply a bias force on the second upper prong that is independent of the force applied by the first bias member.

In accordance with the drive assembly, the rear face includes a rib having a concave cross-section.

In accordance with the drive assembly, the rib is operable to maintain an alignment of the first upper prong and the second upper prong on the rear face of the pawl body.

In accordance with the drive assembly, the rib defines a first recessed surface of the rear face that is engaged by the first upper prong, and a second recessed surface of the rear face that is engaged by the second upper prong.

In accordance with the drive assembly, the pawl body includes a sidewall having a linear outer peripheral surface that engages the ratchet head in a manner that prevents radial movement of the pawl body relative to the ratchet head during a ratcheting operation.

In accordance with the drive assembly, the linear outer peripheral surface engages the ratchet head in a manner that facilitates linear movement of the pawl body relative to the ratchet head to maintain the operational engagement of the external pawl teeth with the external gear teeth during the ratcheting operation.

In accordance with one or more example embodiments, a pawl for a ratchet tool having a ratchet head and a drive gear having external gear teeth comprises one or more of the following: a pawl body mounted on the ratchet head, the pawl body having a concave cross-section with a rear face, a front face with external pawl teeth, and a sidewall having a linear outer peripheral surface that engages the ratchet head to facilitate linear movement of the pawl body relative to the ratchet head in a manner that maintains the operational engagement of the external pawl teeth with the external gear teeth during a ratcheting operation; and a rib on the rear face of the pawl body, the rib having a concave cross-section defining a first recessed surface and a second recessed surface on the rear face.

In accordance with one or more example embodiments, a pawl for a ratchet tool having a ratchet head and a drive gear having external gear teeth comprises one or more of the following: a pawl body having at least one surface with external pawl teeth that operatively engages the external gear teeth, and a sidewall having a linear outer peripheral surface that engages the ratchet head to facilitate linear movement of the pawl body relative to the ratchet head in a manner that maintains the operational engagement of the external pawl teeth with the external gear teeth during a ratcheting operation; and a rib on the rear face of the pawl body, the rib having a curved cross-section defining a first recessed surface and a second recessed surface on the rear face.

In accordance with the pawl, the linear outer peripheral surface of the sidewall engages the ratchet head in a manner that prevents radial movement of the pawl body relative to the ratchet head during a ratcheting operation.

In accordance with one or more example embodiments, a hand tool comprises one or more of the following: a tool head having a front surface defining a first region and a second region; a drive gear mounted on the first region of the ratchet head, the drive gear having external gear teeth; a pawl that includes a pawl body mounted on the second region of the ratchet head, the pawl body having a rear face and a front face with external pawl teeth that operatively engages the external gear teeth; a switch lever including a switch body extending along a longitudinal axis for selective manipulation by a user to change a rotational drive direction of the drive gear, the switch body having an internal space; and a plunger assembly received in the internal space of the switch body, the plunger assembly including a plunger body and a plurality of bias members that includes a first bias member and a second bias member to apply a bias force on the plunger body which transmits an even distribution of the bias force across the width of the rear face of the pawl body to facilitate engagement of the external gear teeth with the external pawl teeth.

In accordance with one or more example embodiments, a hand tool comprises one or more of the following: a tool head having a front surface defining a first region and a second region; a drive gear mounted on the first region of the tool head, the drive gear having external gear teeth; a pawl that includes a pawl body configured on the second region of the ratchet head, the pawl body having at least one surface with external pawl teeth that operatively engages the external gear teeth; a control member extending along an axis for selective manipulation by a user to change a rotational drive direction of the drive gear; and a plunger assembly received by the control member, the plunger assembly including a plunger body and at least one bias member configured to apply a bias force on the plunger body to transmit an even distribution of the bias force across the width of the rear face of the pawl body to facilitate operational engagement of the external gear teeth with the external pawl teeth.

In accordance with the hand tool, the control member defines an internal space having at least one pocket that corresponds to the at least one bias member, and a recess having a thickness that corresponds to the thickness of the plunger body.

In accordance with the hand tool, the control member comprises a pair of spaced apart wall extensions oriented in a direction that that guides the plunger body in the internal space.

In accordance with the hand tool, the plunger body comprises a lower prong received in the recess of the control member.

In accordance with the hand tool, the plunger body comprises a cross member and a pair of upper prongs that extend from the cross member, the upper prongs including a first upper prong and a second upper prong spaced apart from the first upper prong.

In accordance with the hand tool, the at least one bias member is configured to apply a bias force on at least one of the first upper prong and the second upper prong.

In accordance with the hand tool, the internal space comprises a first cylindrical pocket that corresponds to the diameter of the first bias member.

In accordance with the hand tool, the internal space comprises a second cylindrical pocket that corresponds to the diameter of the second bias member.

In accordance with the hand tool, the internal space comprises a recess extending between the first cylindrical pocket and the second cylindrical pocket, the recess having a thickness that corresponds to the thickness of the plunger body.

In accordance with the hand tool, the switch body comprises a pair of spaced apart wall extensions that are oriented in a direction that is perpendicular to the longitudinal axis in a manner that guides the plunger body in the internal space.

In accordance with the hand tool, the plunger body comprises a lower prong received in the internal space of the switch body.

In accordance with the hand tool, the plunger body comprises a pair of upper prongs that extend out of the internal space.

In accordance with the hand tool, the upper prongs comprise a first upper prong and a second upper prong spaced apart from the first upper prong.

In accordance with the hand tool, the first bias member is operable to apply a bias force on the first upper prong.

In accordance with the hand tool, the second bias member is operable to apply a bias force on the second upper prong that is independent of the force applied by the first bias member.

In accordance with the hand tool, the rear face includes a rib having a concave cross-section, the rib operable to maintain an alignment of the first upper prong and the second upper prong on the rear face of the pawl body.

In accordance with the hand tool, the rib defines a first recessed surface of the rear face that is engaged by the first upper prong.

In accordance with the hand tool, the rib defines a second recessed surface of the rear face that is engaged by the second upper prong.

In accordance with the hand tool, the pawl body includes a sidewall having a linear outer peripheral surface that engages the tool head in a manner that prevents radial movement of the pawl body relative to the tool head during operation of the hand tool by a user.

In accordance with the hand tool, the linear outer peripheral surface engages the tool head in a manner facilitates linear movement of the pawl body relative to the tool head to maintain the operational engagement of the external pawl teeth with the external gear teeth during the operation of the hand tool by the user.

DRAWINGS

The various advantages of one or more exemplary embodiments will become apparent to one skilled in the art by reading the following specification and appended claims, and by referencing the following drawings, in which:

Figure 10:
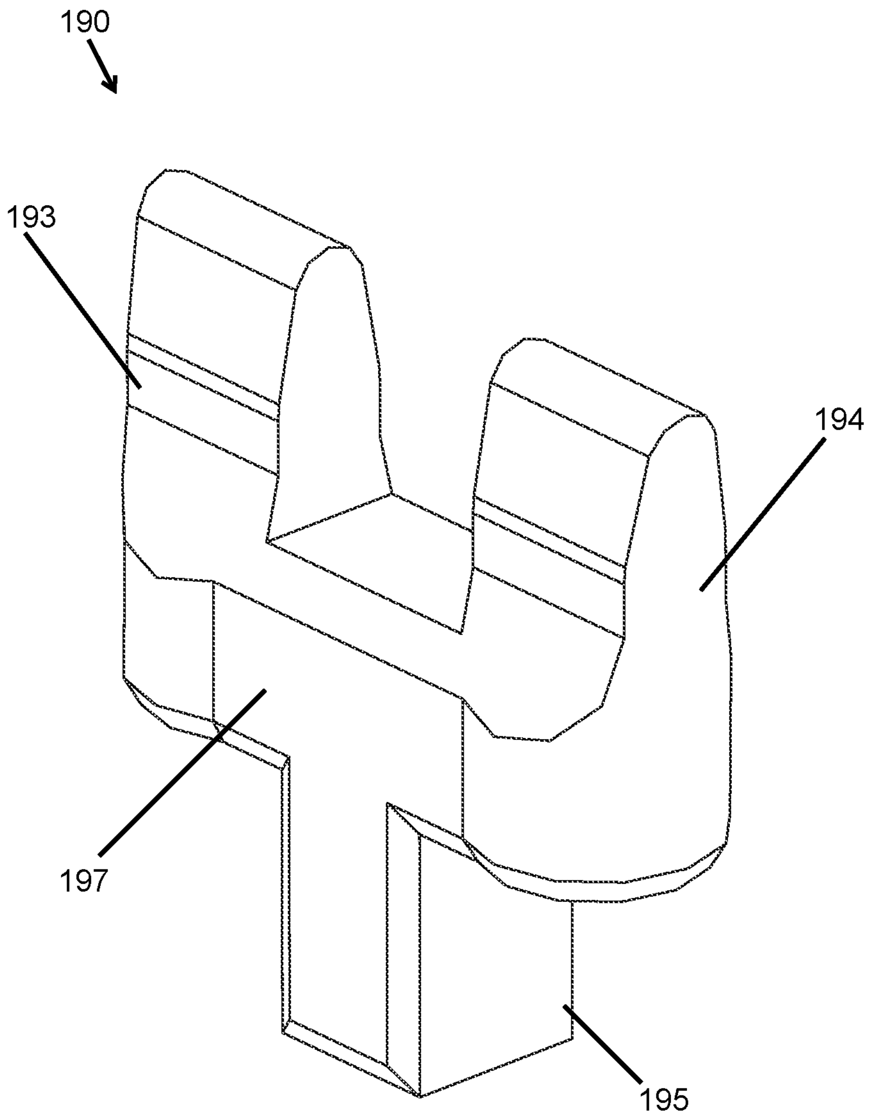
FIG. 10 illustrates a perspective view of the plunger of FIG. 7.
Figure 11:
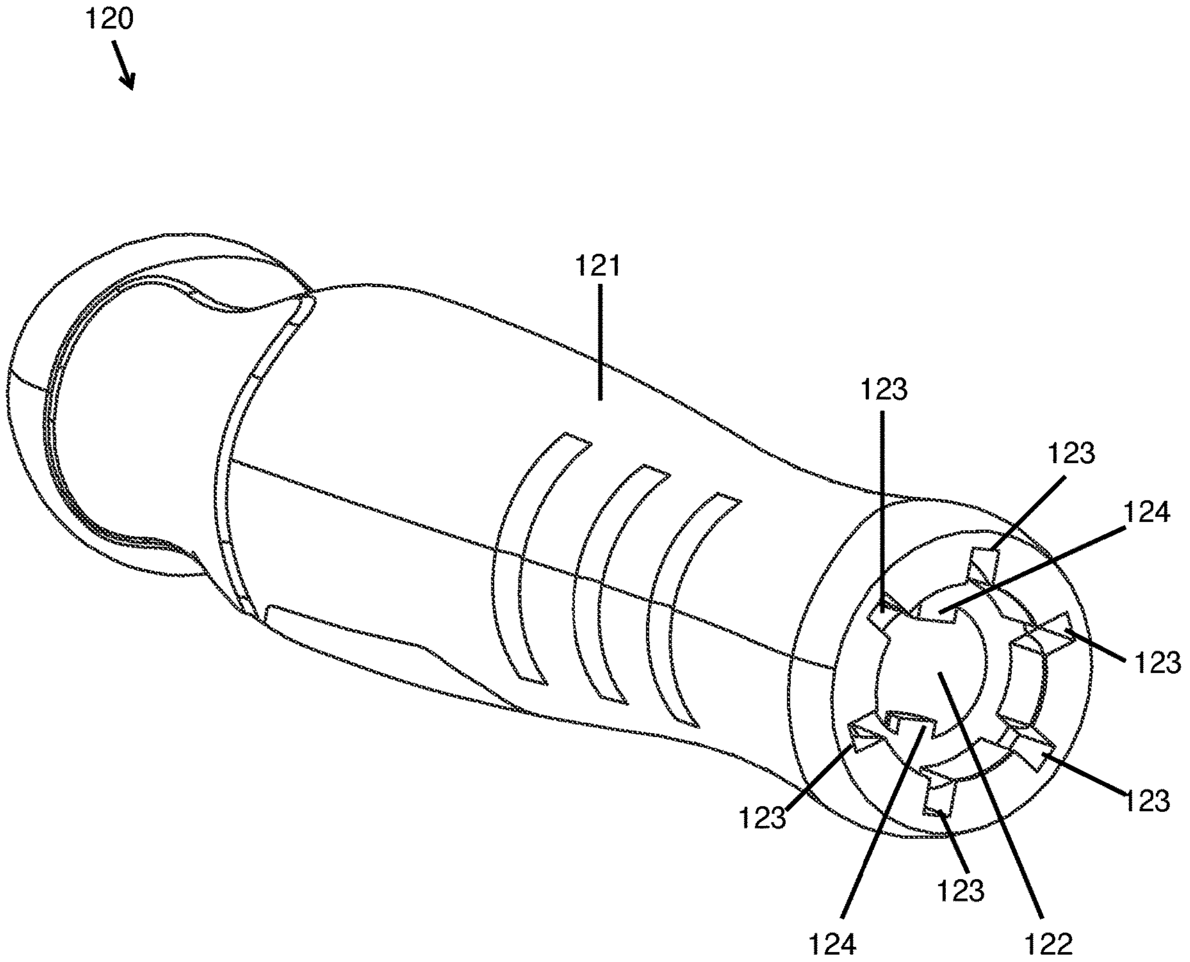
FIG. 11 illustrates a perspective view of a grip of the ratchet tool of FIG. 1.
Figure 12:
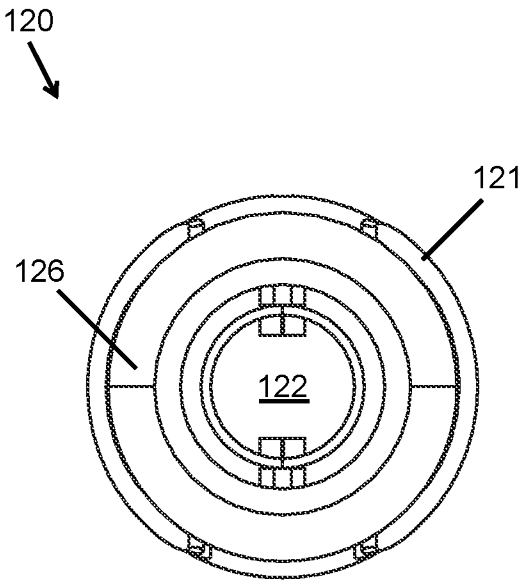
Figure 13:
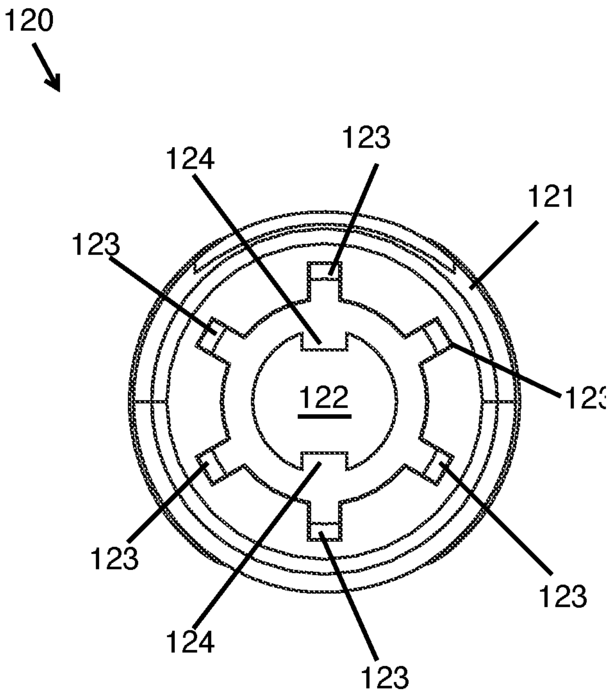

FIGS. 12 and 13 respectively illustrate a front view and a rear view of the grip of FIG. 10.

Figure 14:
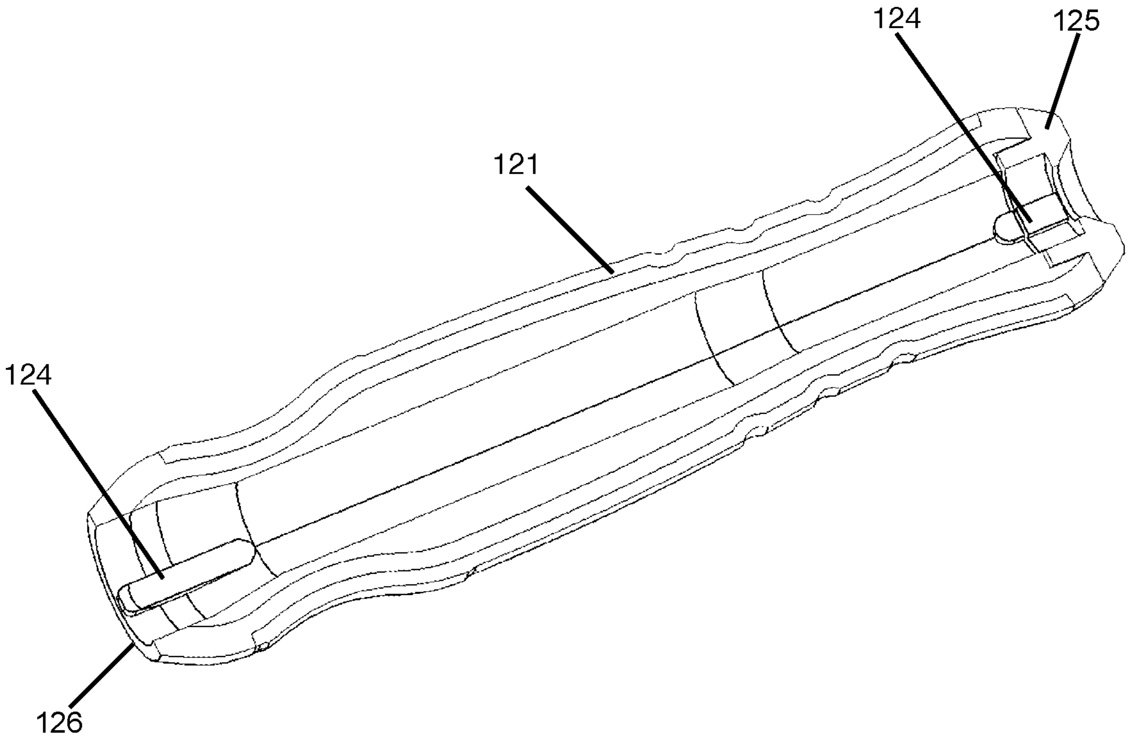

FIG. 14 illustrates a sectional view of the grip of FIG. 10.

Figure 1:
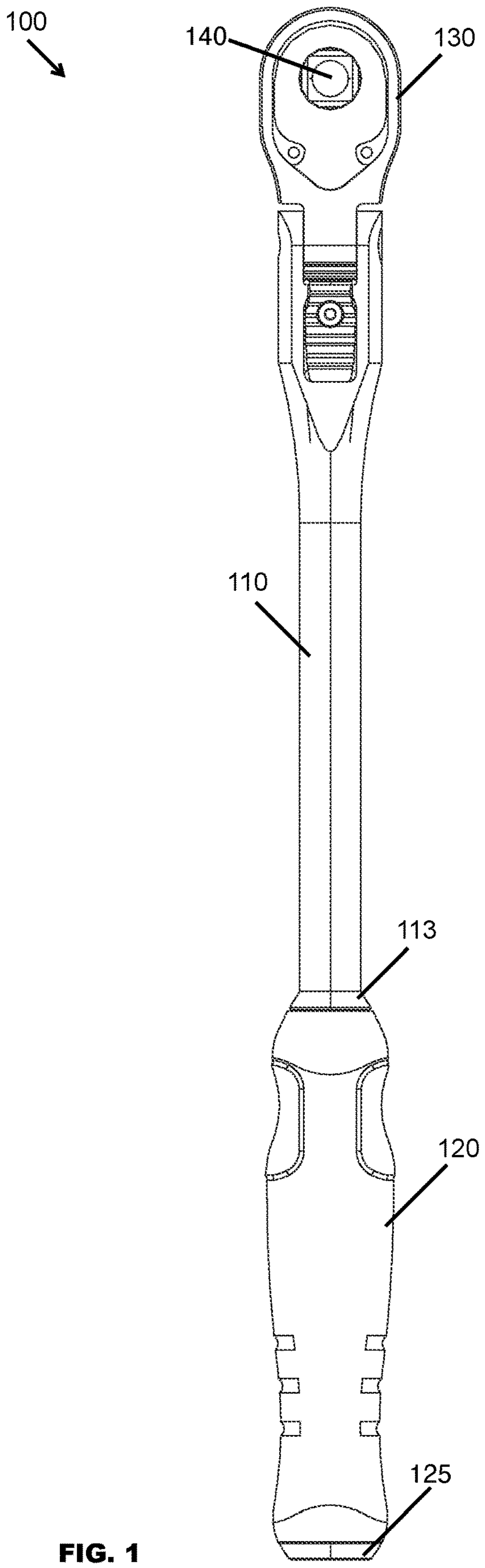
FIG. 1 illustrates a view of an example ratchet tool, in accordance with one or more embodiments set forth, shown, and described herein.
Figure 2:
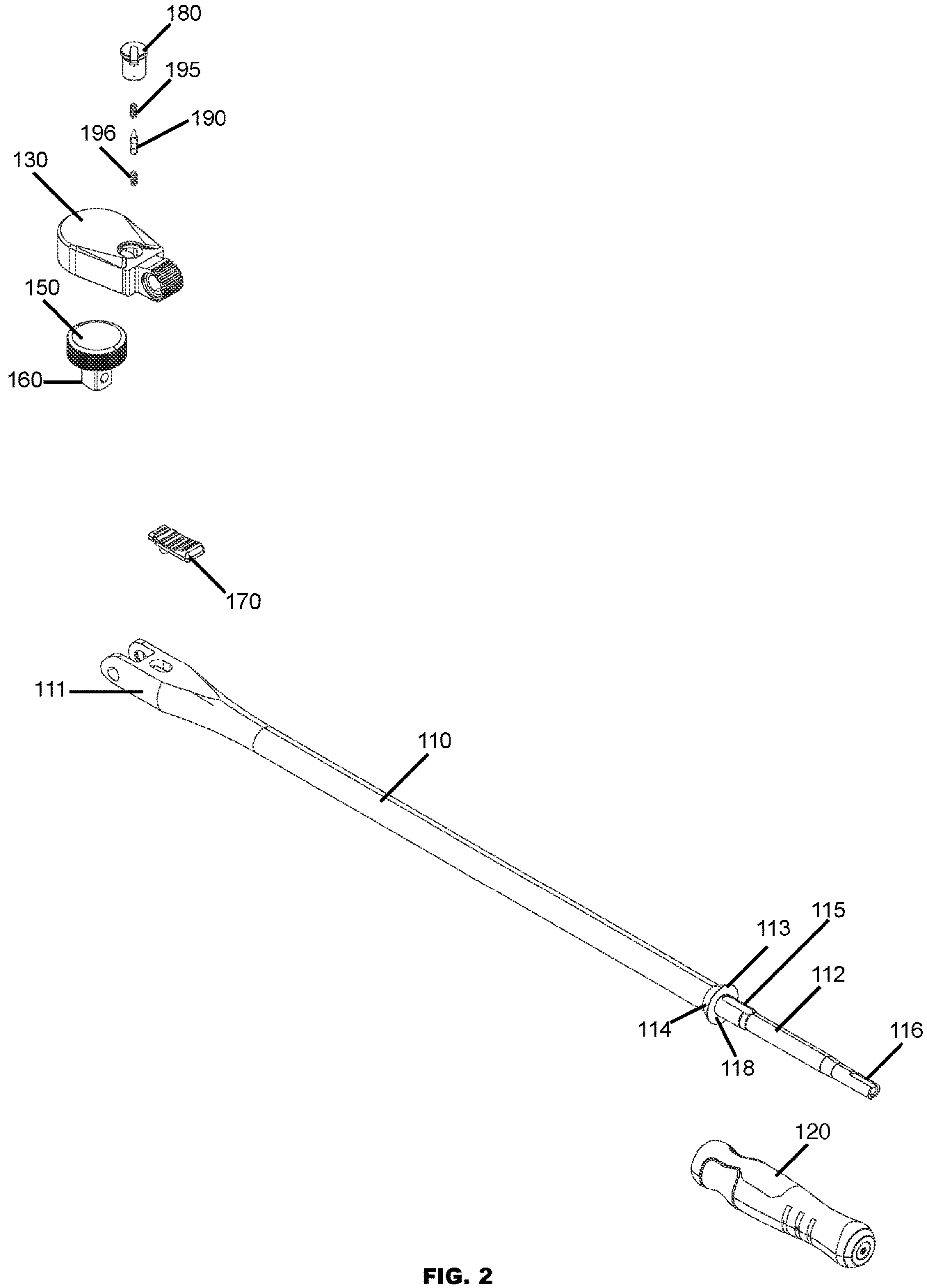
FIG. 2 illustrates an exploded view of the example ratchet tool of FIG. 1.
Figure 15:
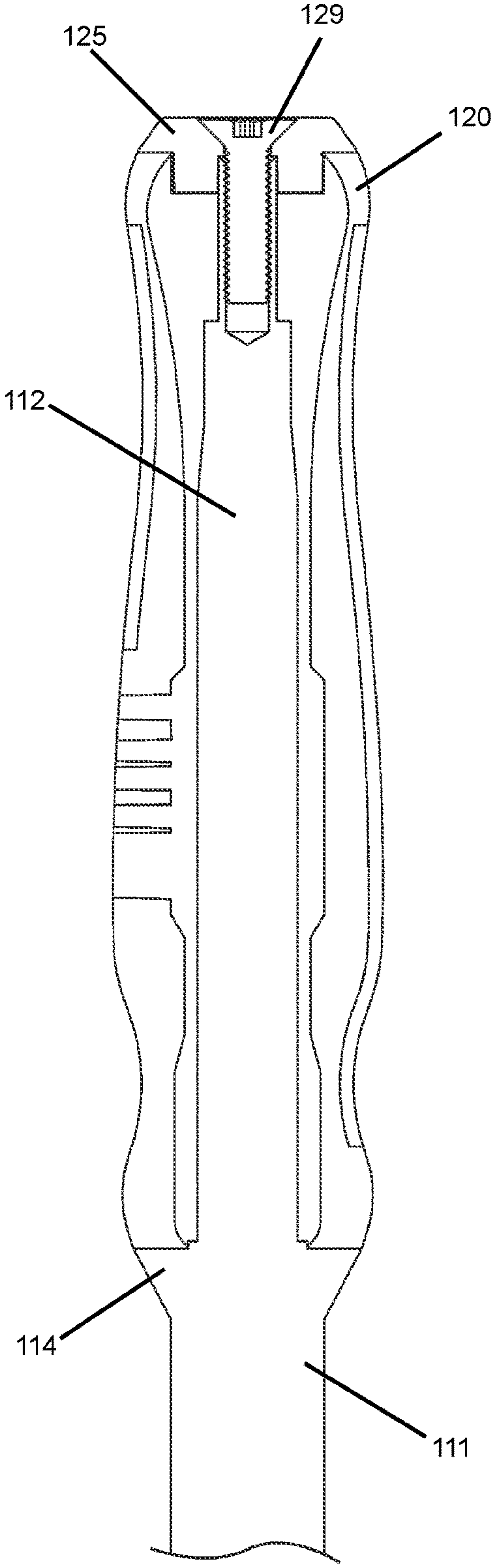

FIG. 15 illustrates a sectional view of view of an interlocking connection between the handle and the grip of the ratchet tool of FIG. 1.

Figure 16:
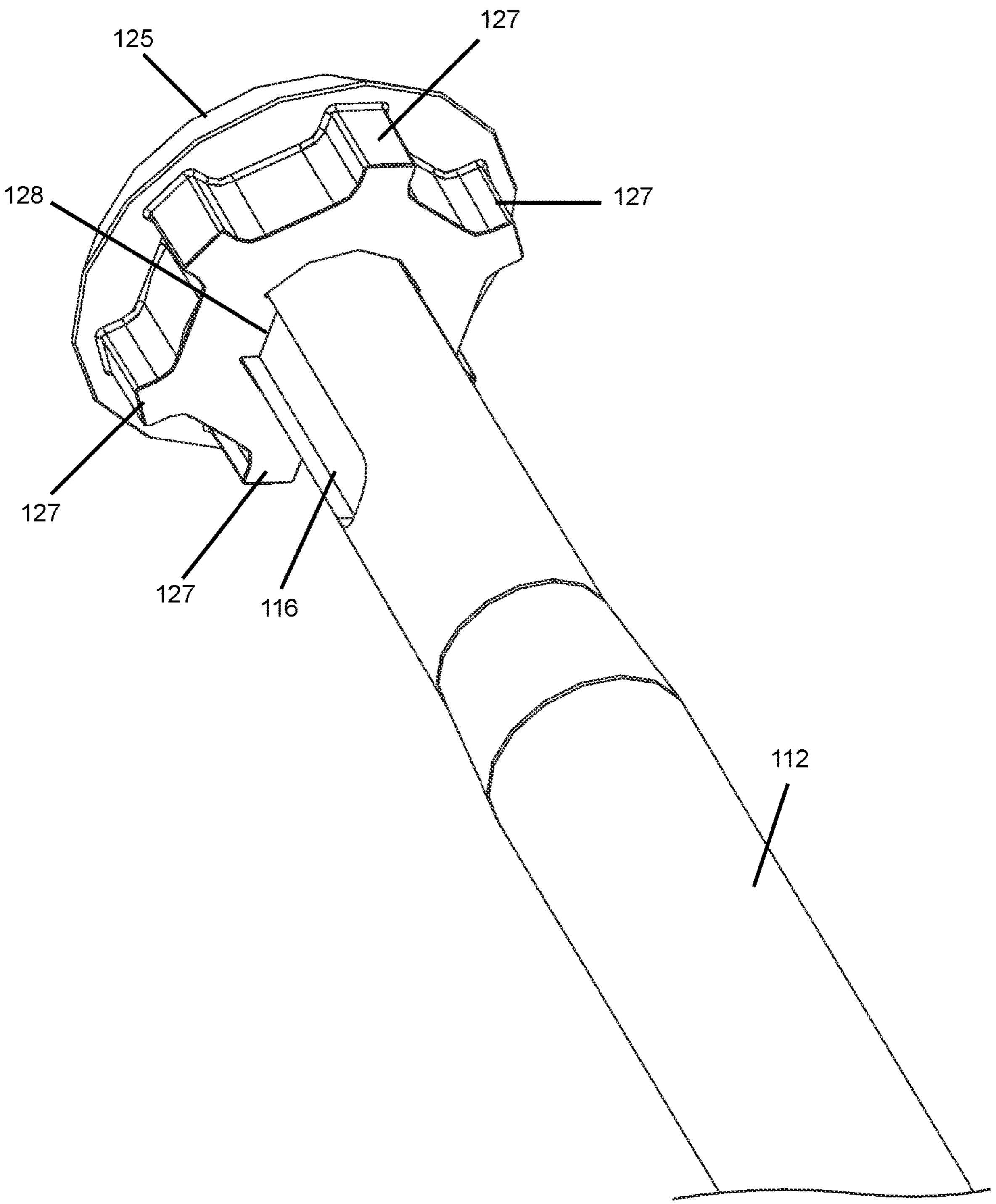

FIG. 16 illustrates a perspective view of a handle coupled to an end cap, in accordance with one or more embodiments set forth, shown, and described herein.

DESCRIPTION

Turning to the figures, which illustrates an example ratchet tool 100, in accordance with one or more embodiments. Although the illustrated example embodiments show implementation of a ratchet tool, embodiments are not limited thereto. This disclosure contemplates the tool being implemented as any suitable hand tool that falls within the spirit and scope of the principles of this disclosure.

The example ratchet tool 100 in accordance with one or more embodiments set forth, described, and/or illustrated herein comprises a drive assembly that includes a pawl, a control member, at least one bias member, and a plunger assembly that enables a user to apply sufficient torque when performing ratcheting operation to quickly and efficiently fasten and/or remove a mechanical fastener. The ratchet tool also comprises a removeable and interchangeable grip that enables the ratchet tool 100 to be field-serviceable for damage repair or customization by quickly replacing the grip with another suitable grip.

The ratchet tool 100 may comprise one or more operational elements. Some of the possible operational elements of the ratchet tool 100 are illustrated in the figures and will now be described. It will be understood that it is not necessary for the ratchet tool 100 to incorporate all the elements illustrated in the figures set forth, and/or described herein. The ratchet tool 100 may have any combination of the various elements illustrated herein. Moreover, the ratchet tool 100 may have additional operational elements to those illustrated in the figures.

As illustrated in FIG. 1, the example ratchet tool 100 comprises a handle member 110, a ratchet head 130 coupled to the handle member 110, and a drive assembly 140. A removeable and interchangeable grip 120 having a grip body 121 with a gripping surface that enables a user to maintain a grip of the handle member 110 when fastening and removing a mechanical fastener (e.g., bolt, nut, etc.) when engaged in a ratcheting operation.

As illustrated in FIGS. 2 and 10 through 14, the handle member 110 is tapered in a longitudinal direction thereof to define a ratchet region 111 that is coupled to the ratchet head 130 and a grip region 112 that is removably coupled to the grip 120. The outer diameter of the handle member 110 at the ratchet region 111 is greater than the outer diameter of the handle member 110 at the grip region 112. An intermediate region 113 of the handle member 110 serves as a transition between the ratchet region 111 and the grip region 112. Although the illustrated example embodiment shows the handle member 110 formed having a generally circular cross-sectional profile along its axial length, embodiments are not limited thereto. This disclosure contemplates the handle member 110 formed having any suitable geometric cross-sectional profile that falls within the spirit and scope of the principles of this disclosure. For example, the handle member 110 can be formed having a generally square cross-sectional profile, a generally rectangular cross-sectional profile, a generally oval cross-sectional profile, and any combinations thereof. In one example implementation of the handle member 110, the cross-sectional profile of the grip region 112 may, in whole or in part, have a generally rectilinear (square or rectangular) cross-sectional profile defining flat surfaces that correspond to the cross-sectional profile of the central bore/channel/cavity 122. In another example implementation of the handle member 110, the cross-sectional profile of the grip region 112 may, in whole or in part, comprise a pair of opposing curvilinear sidewalls and a pair of opposing rectilinear sidewalls.

An exterior surface of the ratchet head 130 has a peripheral sidewall 131 that defines a first recessed surface comprising a drive gear pocket 132 and a second recessed surface comprising a pawl pocket 133. The handle member 110 or grip 120 may be formed by metal injection molding (MIM) that uses in whole or in part, a durable metal material. Such a durable metal material may comprise, for example, chrome. Embodiments, however, are not limited thereto, and thus, this disclosure contemplates the handle member 110 being formed of any suitable material that falls within the spirit and scope of the principles of this disclosure.

An exterior surface of the ratchet head 130 has a peripheral sidewall 131 that defines a first recessed surface comprising a drive gear pocket 132 and a second recessed surface comprising a pawl pocket 133. The handle member 120 may be formed by metal injection molding (MIM) that uses in whole or in part, a durable metal material. Such a durable metal material may comprise, for example, chrome. Embodiments, however, are not limited thereto, and thus, this disclosure contemplates the handle member 110 being formed of any suitable material that falls within the spirit and scope of the principles of this disclosure.

As illustrated in FIGS. 11 through 14, the grip body 121 is formed as a unitary structure which, in an assembly position, covers or otherwise encapsulates the grip region 112 of the handle member 110. The grip body 121 includes a central bore/channel/cavity 122 substantially extending throughout the axial length of the grip body 121. The central bore/channel/cavity 122 has a diameter that corresponds to the outside diameter of the grip region 112 to facilitate the receipt of the grip region 112 therein. Although the illustrated embodiment shows the grip body 121 is formed as a unitary structure, embodiments are not limited thereto. This disclosure contemplates the grip body 121 being formed having any structural configuration that falls within the spirit and scope of the principles of this disclosure. For example, the grip body 121 may be formed having a plurality of interconnected grip body sections. Moreover, although the illustrated example embodiment shows the central bore/channel/cavity 122 formed having a generally circular cross-sectional profile along its axial length, embodiments are not limited thereto. This disclosure contemplates the central bore/channel/cavity 122 formed having any suitable geometric cross-sectional profile that falls within the spirit and scope of the principles of this disclosure. For example, the central bore/channel/cavity 122 can be formed having a generally square cross-sectional profile, a generally rectangular cross-sectional profile, a generally oval cross-sectional profile, and any combinations thereof. In one example implementation of the grip body 121, the central bore/channel/cavity 122 may, in whole or in part, have a generally rectilinear (square or rectangular) cross-sectional profile defining flat surfaces that correspond to the cross-sectional profile of the handle member 110. In another example implementation of the grip body 121, the cross-sectional profile of the central bore/channel/cavity 122 may, in whole or in part, comprise a pair of opposing curvilinear sidewalls and a pair of opposing rectilinear sidewalls that correspond to the cross-sectional profile of the handle member 110.

The forward end of the grip body 121 includes the forward contact face 126 that is oriented in a plane which is perpendicular from the longitudinal axis of the grip body 121. In an assembled position, the forward contact face 126 is engaged by the axial stop 114. One or more internal mating ribs 124 are arranged on an inner surface or wall within the central bore/channel/cavity 122 for receipt in the forward axial grooves 115 of the intermediate region 113 of the handle member 110 to form an interlocking connection that prevents rotation of the grip body 121 relative to the handle member 110 during a ratcheting operation.

The aft end of the grip body 121 includes an aft contact face that is oriented in a plane which is perpendicular from the longitudinal axis of the grip body 121. The aft contact face has a plurality of symmetrically-spaced radial grooves 123 and the plurality of internal ribs 124 that located in the central bore/channel/cavity 122.

The grip body 121 can be formed in whole or in part, of an overmolded material that is shaped in a manner that accommodates the ergonomic demands of a user when using the ratchet tool 100 in a ratcheting operation. The overmolded material can comprise elastomeric or non-elastomeric materials, including, but not limited to polypropylene and/or thermoplastic rubber. Embodiments, however, are not limited thereto, and thus, this disclosure contemplates the grip body 121 being formed of any suitable material(s) that falls within the spirit and scope of the principles of this disclosure.

As illustrated in FIGS. 14 and 15, an annular washer or end cap 125 is coupled to a rear end of the grip 120 to secure the grip body 121 on the handle member 110. The end cap 125 includes a plurality of raised circumferential ribs 127 extending radially outward therefrom that are spatially aligned with the radial grooves 123 of the grip body 121 for receipt therein. The end cap 125 also includes an opening sized to receive the handle member 110 at the grip region 112. One or more internal splines or ribs 128 of the end cap 125 extends radially inward towards the opening to be received in corresponding aft axial grooves 116 of the handle member 110. In one example implementation of the end cap 125, the opening have a cross-sectional profile that corresponds to the cross-sectional profile of the handle member 110.

A mechanical fastener is provided to further maintain the connection between the handle member 110 and the grip body 121. In the illustrated embodiment, the mechanical fastener comprises a flat head cap screw 129 having a threaded shaft portion that extends through the opening of the end cap 125 for coupling with corresponding threads in a threaded central bore 117 at an aft face of the grip region 112, and a head portion that contacts an outer face of the end cap 125. The flat head cap screw 129 provides axial compressive force to retain the grip body 121 and remove any assembly clearance. Once assembled, a user may tighten the flat head cap screw 129, which simultaneously centers and tensions the grip body 121 onto the handle member 110 and takes up any clearance or stack-up tolerance between the grip body 121 and the handle member 110. After its tightening, the flat head cap screw 129 also prevents longitudinal movement between the handle member 110 and the grip 120.

By virtue of the connection between the end cap 125 and the grip body 121, and the end cap 125 and the handle member 110, rotation of the grip 120 relative to the handle member 110 during a ratcheting operation is prevented. A user may quickly and easily replace the grip 120 with a replacement grip by unscrewing the flat head cap screw 129, and manually separating the end cap 125 from the handle member 110 and the grip body 121. The grip body 121 may then be separated from the handle member 110, to permit its replacement with a replacement grip. Should, during use, the grip 120 becomes damaged, a user can easily and quickly replace the grip body 121 by unthreading the flat head cap screw 129 and axially sliding the grip body 121 off of the handle member 110. A new grip body 121 can then be fitted and the ratchet tool 100 returned to service without the need to warranty the entire ratchet tool 100. Should a user want to change the visual appearance of ratchet tool 100, the grip body 121 can also be interchanged with a similar grip body 121 of a different color, allowing previously unavailable opportunity for customization by the user.

Figure 3:
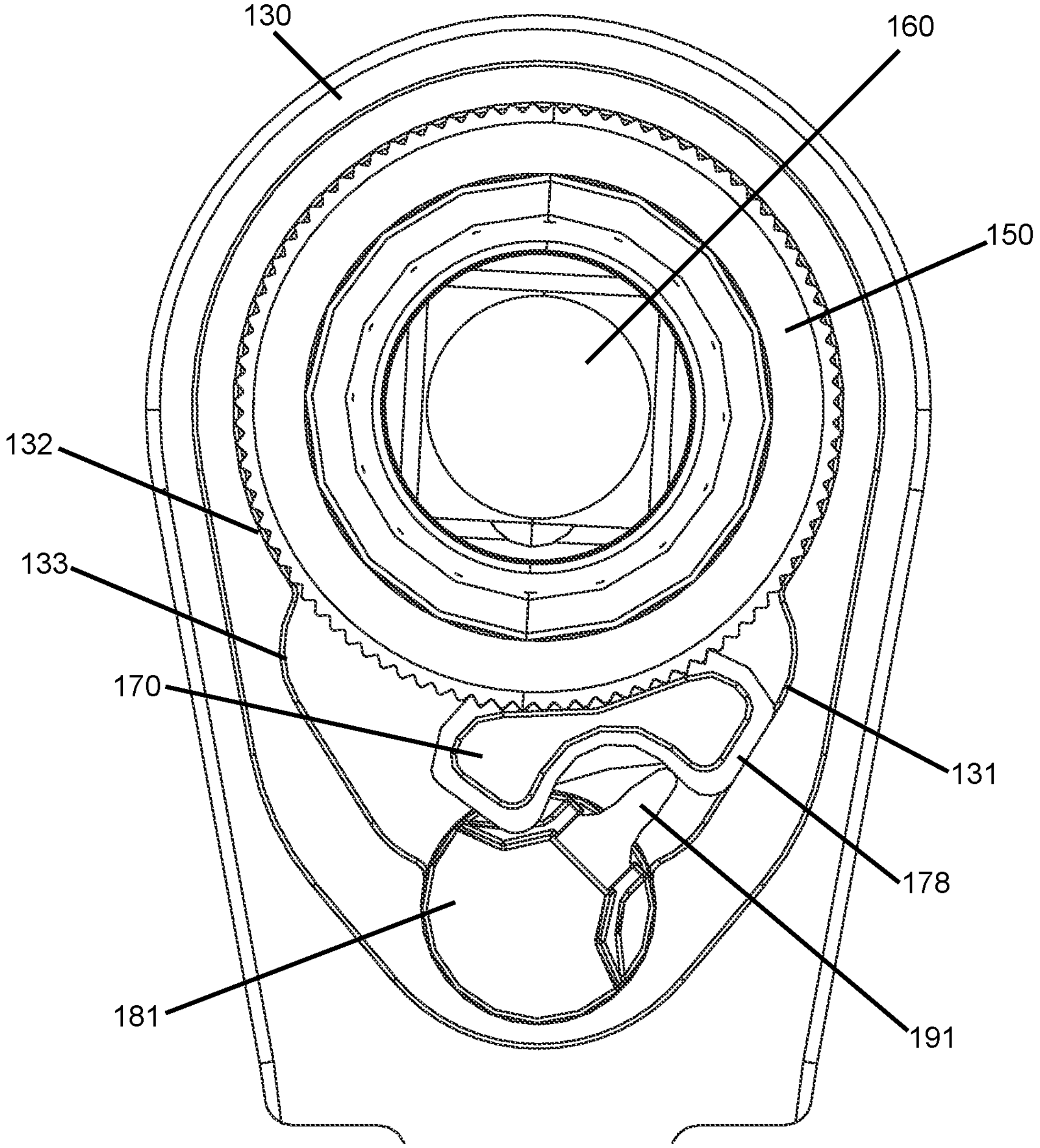
FIGS. 3 through 5 illustrate a view of a drive assembly of the example ratchet tool of FIG. 1.
Figure 4:
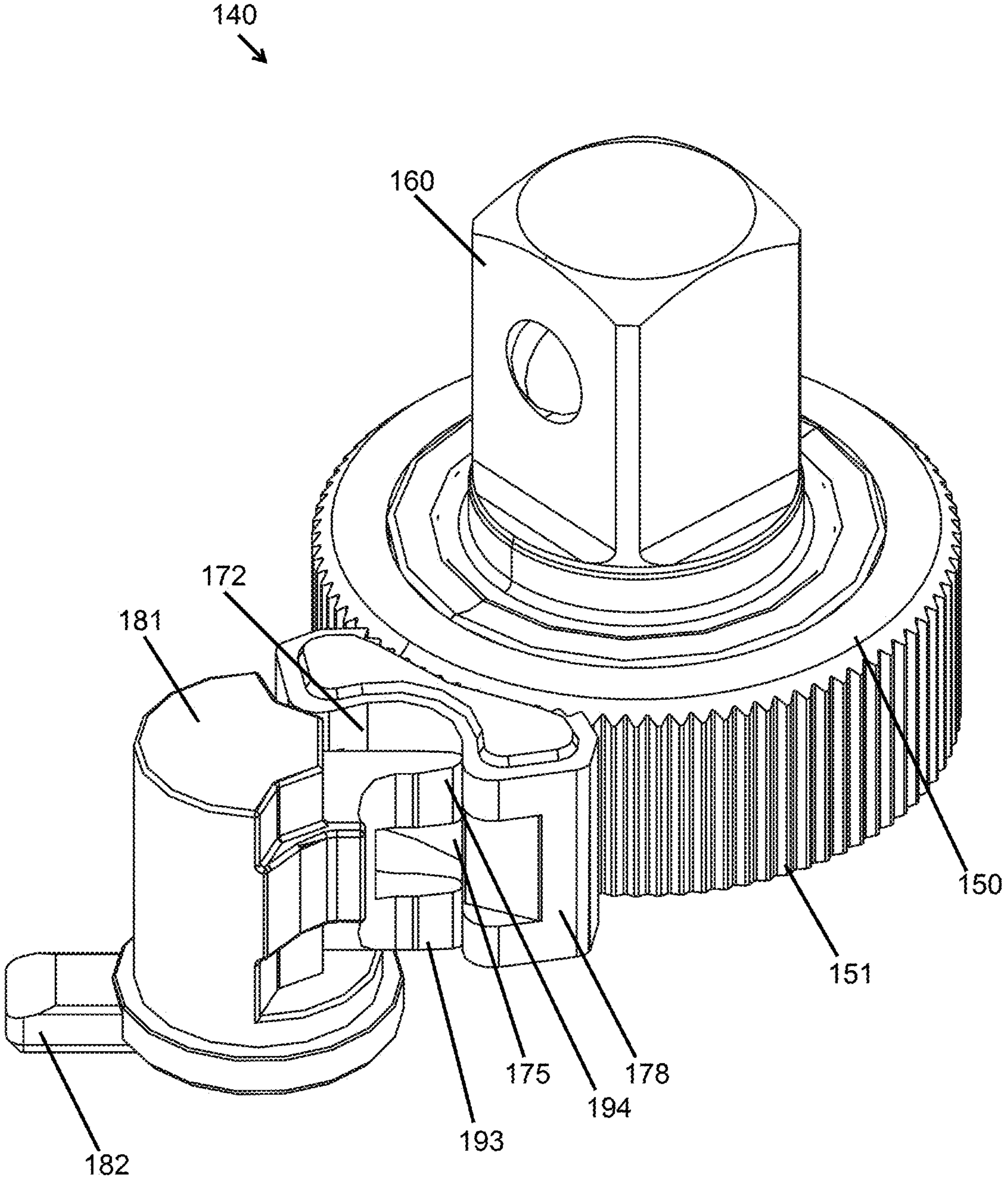
Figure 5:
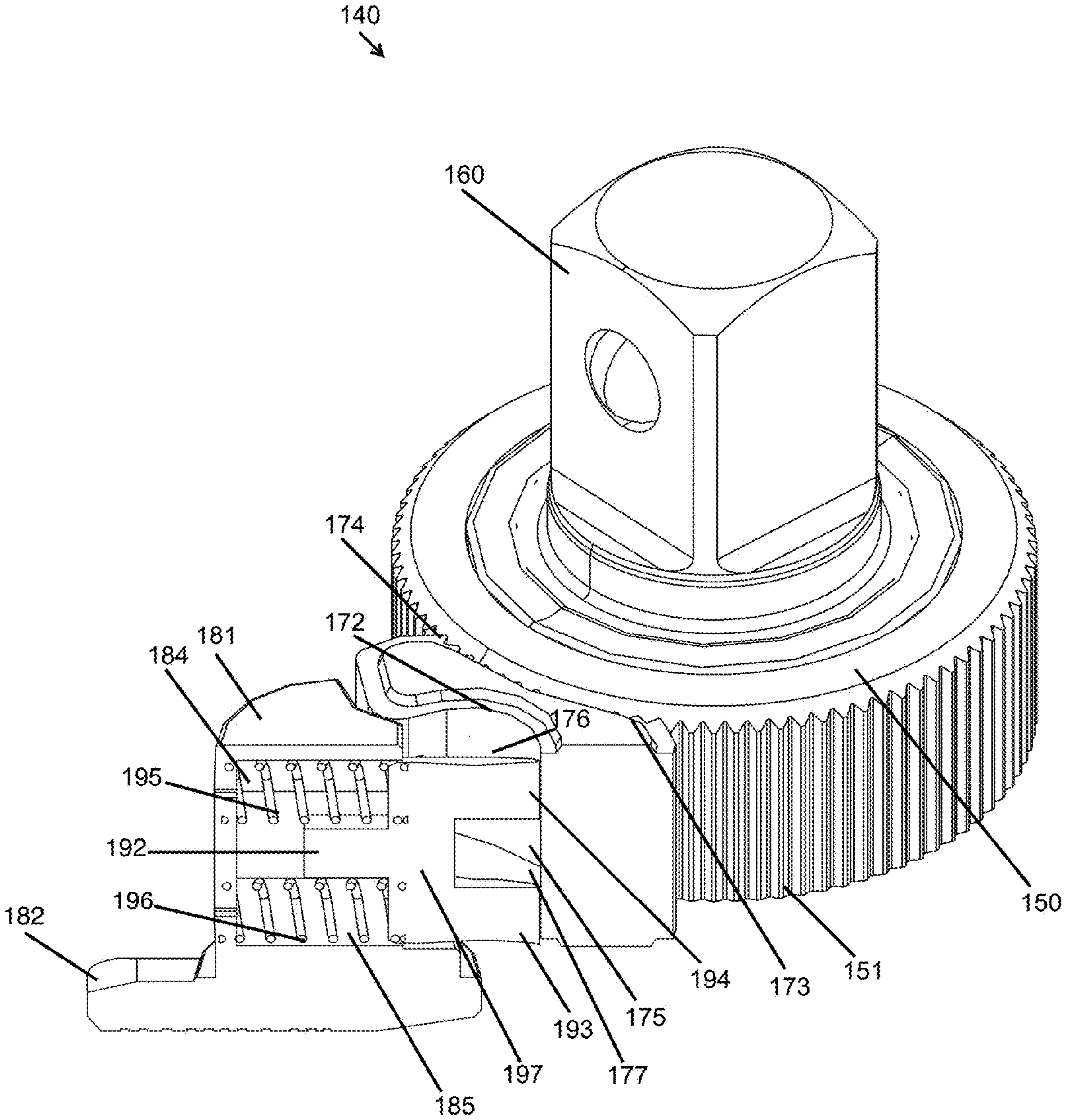

As illustrated in FIGS. 3 through 5, the drive assembly 140 comprises an annular drive gear 150, a drive lug 160 which is driven for rotation by the drive gear 150, a pawl 170, a control member 180, and a plunger assembly 190. The components of the drive assembly may be formed by metal injection molding (MIM) that uses in whole or in part, a durable metal material. Such durable metal materials includes, but is not limited to, steel and stainless steel. Embodiments, however, are not limited thereto, and thus, this disclosure contemplates the components of the drive assembly being formed of any suitable material that falls within the spirit and scope of the principles of this disclosure.

The drive gear 150 is mounted in the drive gear pocket 132 of the ratchet head 130 for rotation about a gear axis. The drive gear 150 has a ring shape or cross-section having a plurality of external gear teeth 151 radially extending from an outer periphery thereof.

The drive lug 160 is driven for rotation by the drive gear 150, and is operable to receive a tool component, including, but not limited to a socket or tool that enables the user to fasten and remove the mechanical fastener. Although the illustrated example embodiments feature the drive lug 160 formed as a male drive lug operable for connection to a female tool component, embodiments are not limited thereto. This disclosure contemplates the drive lug 160 having any structural configuration that falls within the spirit and scope of the principles of this disclosure. For example, the drive lug 160 may be formed as a female drive lug operable for connection to a male tool component.

Figure 6:
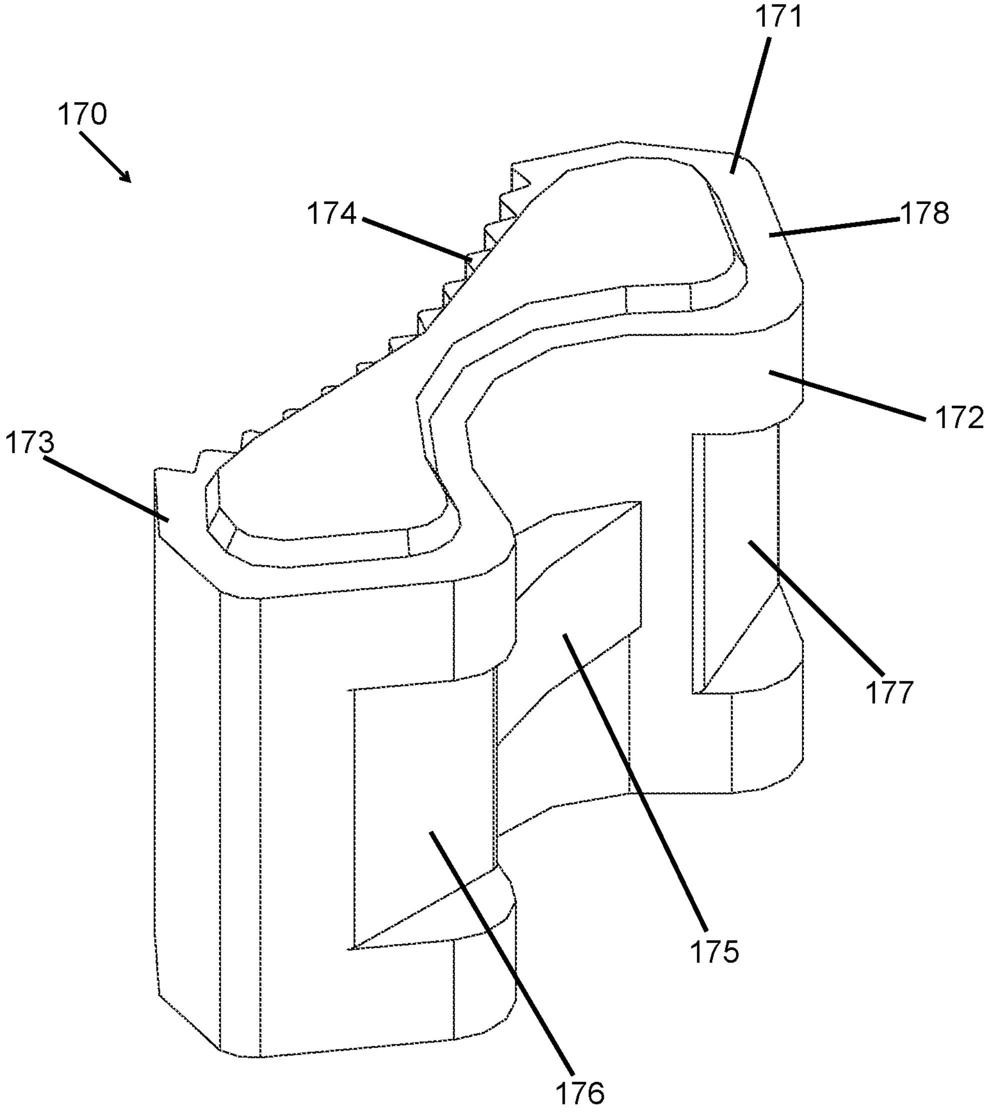
FIG. 6 illustrates a perspective view of a pawl for the example ratchet tool of FIG. 1.

As illustrated in FIGS. 3 and 6, the pawl 170 comprises a pawl body 171 mounted in the pawl pocket 133 of the ratchet head 130 for biased engagement with the drive gear 150. The pawl body 171 has a generally concave rear face 172 and a generally concave front face 173 with a plurality of external pawl teeth 174 that mesh with or otherwise engages the external gear teeth 151 of the drive gear 151 induced by the bias force.

The rear face 172 comprises a rib 175 that extends at least partially across the width of the pawl body 171, and itself has a generally concave outer surface or cross-section. Advantageously, the thickness of the pawl body 171 is greater at the rib 175 than other sections of the pawl body 171, which imparts a more robust structural configuration that enhances the overall strength of the pawl body 171. The robust structural configuration via the rib 175 protects against premature mechanical failure of the pawl body 171 during a ratcheting operation. In turn, the rib 175, providing additional thickness to the pawl body 171, serves to prolong the operational life of the pawl body 171. Advantageously, the added thickness of the pawl body 171 via the rib 175, facilitates even and consistent distribution of the bias force across the width of the pawl body 171, which is critical to ratchet functionality.

The pawl body 171 also includes a sidewall having linear outer peripheral surface 178. In an operative position of the pawl body 171 in the pawl pocket 133 of the ratchet head 130, the linear outer peripheral surface 178 engages the peripheral sidewall 131 of the ratchet head 130 in a manner that prevents radial movement of the pawl body 171 relative to the ratchet head 130. Advantageously, due to the linear structural configuration of the sidewall, the pawl body 171 moves linearly (not radially) relative to the ratchet head 130 during a ratcheting operation. In this way, engagement between the external gear teeth 151 and the external pawl teeth 174 is maintained during the ratcheting operation.

Figure 7:
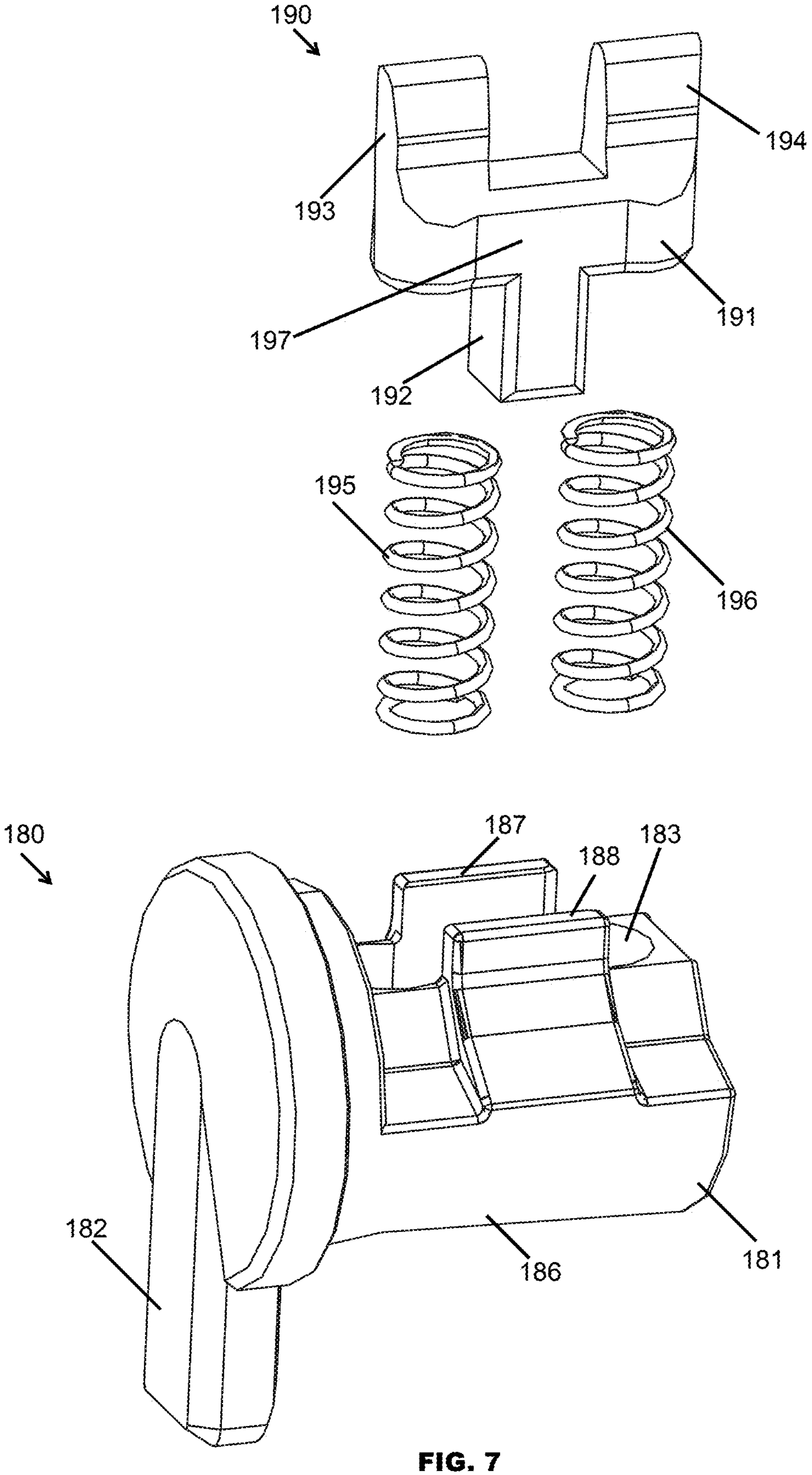
FIG. 7 illustrates an exploded view of a control member and a plunger assembly for the example ratchet tool of FIG. 1.
Figure 8:
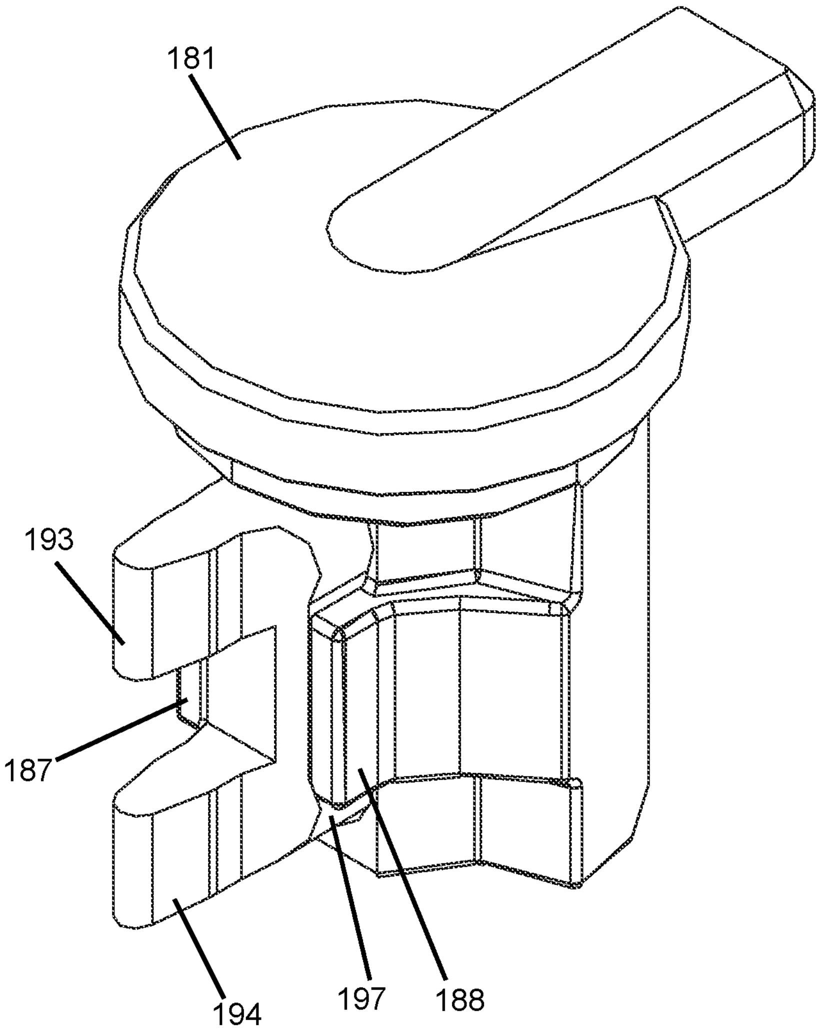
FIG. 8 illustrates the plunger assembly seated in the control member of FIG. 7.
Figure 9:
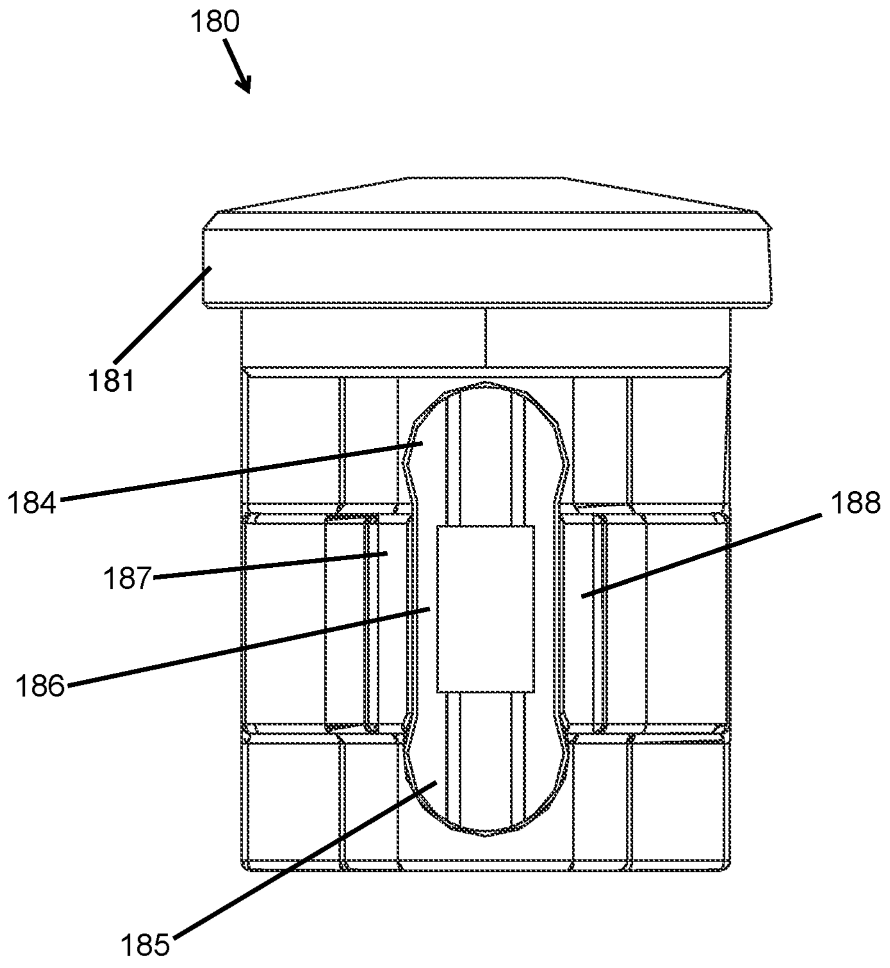
FIG. 9 illustrates a top view of the control member of FIG. 7.

As illustrated in FIGS. 7 through 9, the control member 180 comprises a switch lever having a switch body 181 that extends in operable for selective manipulation by the user to change a rotational drive direction of the drive gear 150. The switch body 181 has an internal space to receive at least a portion of the plunger body 191. The internal space comprises a first cylindrical pocket 184 which receives a first bias member 195, a second cylindrical pocket 185 which receives a second bias member 196, and a generally rectangular shaped recess 186 that extends between the first cylindrical pocket 184 and the second cylindrical pocket 185. In the illustrated example embodiment, the first bias member 195 and the second bias member 196 are formed as compression springs. Embodiments, however, are not limited thereto, and thus, this disclosure contemplates the first bias member 195 and the second bias member 196 encompassing other types of structural configurations that fall within the spirit and scope of the principles of this disclosure set forth herein.

The first cylindrical pocket 184 has a configuration that corresponds to the diameter of the first bias member 195, and second cylindrical pocket 185 has a configuration that corresponds to the diameter of the second bias member 196. The recess 186 has a configuration that corresponds to the thickness of the plunger body 191, and particularly, the lower prong 192 of the plunger body 191.

The switch body 181, which extends along a longitudinal axis of the switch lever, further comprises a pair of spaced apart wall extensions that include a first wall extension 187 and a first wall extension 188. The first wall extension 187 and the first wall extension 188 are spatially oriented in a direction that is perpendicular to the longitudinal axis to advantageously guide and maintain the position of the plunger body 191 in the internal space during a ratcheting operation. The first wall extension 187 and the first wall extension 188 also enables the plunger body 191 to transfer the bias force from the first bias member 195 and the second bias member 196 to the pawl body 171 during a ratcheting operation in a manner that provides even distribution of loading by the pawl body 171 to the gear body 151.

As illustrated in FIG. 10, the plunger body 191 comprises a lower prong 192 that terminates to a laterally extending cross member 197, and a pair of symmetrically oriented upper prongs 192, 193 that extend from the cross member 197 so as to be oriented substantially perpendicularly from the cross member 197. The lower prong 192 is received in the internal space (e.g., recess 186) of the switch body 181, and the pair of symmetrically oriented upper prongs 192, 193 are configured to engage the rear face 172 of the pawl body 171. The upper prongs comprise a first upper prong 193 and a second upper prong 194. The lower prong 192 is centrally positioned relative to the first upper prong 193 and the second upper prong 194, and rides within the internal space of the switch body 181 to locate and guide the first upper prong 193 and the second upper prong 194 as it moves in and out of the internal space of the switch body 181 during a ratcheting operation.

In an operating or assembled position of the plunger body 191 in the internal space of the switch body 181, the first upper prong 193 is spatially aligned with a central axis of the first bias member 195, and thus, is urged under the bias force of the first bias member 195 in a direction towards a first recessed surface 176 of the rear face 172 of the pawl body 171. Under the bias force, the first upper prong 193 transfers the bias force to the rear face 172 of the pawl body 171 at the first recessed surface 176. In an operating or assembled position of the plunger body 191 in the internal space of the switch body 181, the second upper prong 194 is spatially aligned with a central axis of the second bias member 196, and thus, is urged under the bias force of the second bias member 196 in a direction towards a second recessed surface 177 of the rear face 172 of the pawl body 171. Under the bias force, the second upper prong 194 transfers the bias force to the rear face 172 of the pawl body 171 at the second recessed surface 177. The constant transfer of bias force by the first upper prong 193 and the second upper prong 194 to the rear face 172 of the pawl body 171 causes and maintains even distribution of loading from the external pawl teeth 174 to the external gear teeth 151 during a ratcheting operation.

The terms "coupled," "attached," or "connected" can be used herein to refer to any type of relationship, direct or indirect, between the components in question, and can apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings and specification.

What is claimed is:

1. A ratchet tool, comprising:

a ratchet head having a front surface defining a first region and a second region;

a drive gear mounted on the first region of the ratchet head, the drive gear having external gear teeth;

a pawl that includes a pawl body configured on the second region of the ratchet head, the pawl body having a front face with external pawl teeth that operatively engages the external gear teeth and a rear face having a rib having a concave cross-section that defines recessed surfaces of the rear face;

a control member extending along an axis for selective manipulation by a user to change a rotational drive direction of the drive gear; and a plunger assembly received by the control member, the plunger assembly including a plunger body comprising a pair of upper prongs and at least one bias member configured to apply a bias force on the plunger body that causes the upper prongs to engage the recessed surfaces of the rear face of the pawl body and to transmit an even distribution of the bias force across the width of the recessed surfaces of the rear face of the pawl body to facilitate operational engagement of the external gear teeth with the external pawl teeth.

2. The ratchet tool of claim 1, wherein the control member defines an internal space having at least one pocket that corresponds to the at least one bias member, and a recess having a thickness that corresponds to the thickness of the plunger body.

3. The ratchet tool of claim 2, wherein the control member comprises a pair of spaced apart wall extensions oriented in a direction that that guides the plunger body in the internal space.

4. The ratchet tool of claim 2, wherein the plunger body further comprises:

a lower prong received in the recess of the control member; and a cross member and wherein the upper prongs extend from the cross member, the upper prongs including a first upper prong and a second upper prong spaced apart from the first upper prong.

5. The ratchet tool of claim 4, wherein the at least one bias member is configured to apply a bias force on at least one of the first upper prong and the second upper prong.

6. The ratchet tool of claim 4, wherein the rib is operable to maintain an alignment of the first upper prong and the second upper prong on the rear face of the pawl body.

7. The ratchet tool of claim 6, wherein the rib defines:

a first recessed surface of the rear face of the pawl body that is engaged by the first upper prong, and a second recessed surface of the rear face of the pawl body that is engaged by the second upper prong.

8. The ratchet tool of claim 1, wherein the pawl body includes a sidewall having a linear outer peripheral surface configured to engage the ratchet head in a manner that prevents radial movement of the pawl body relative to the ratchet head during a ratcheting operation.

9. The ratchet tool of claim 8, wherein the linear outer peripheral surface is configured to engage the ratchet head in a manner that facilitates linear movement of the pawl body relative to the ratchet head to thereby maintain the operational engagement of the external pawl teeth with the external gear teeth during the ratcheting operation.

10. A drive assembly for a ratchet tool, the drive assembly comprising:

a drive gear having external gear teeth;

a pawl that includes a pawl body configured on the second region of the ratchet head, the pawl body having a front face with external pawl teeth that operatively engages the external gear teeth and a rear face having a rib having a concave cross-section that defines recessed surfaces of the rear face;

a control member extending along an axis for selective manipulation by a user to change a rotational drive direction of the drive gear; and a plunger assembly received by the control member, the plunger assembly including a plunger body comprising a pair of upper prongs and at least one bias member configured to apply a bias force on the plunger body that causes the upper prongs to engage the recessed surfaces of the rear face of the pawl body and to transmit an even distribution of the bias force across the width of the recessed surfaces of the rear face of the pawl body to facilitate operational engagement of the external gear teeth with the external pawl teeth.

11. The drive assembly of claim 10, wherein the control member defines an internal space having at least one pocket that corresponds to the at least one bias member, and a recess having a thickness that corresponds to the thickness of the plunger body.

12. The drive assembly of claim 11, wherein the control member comprises a pair of spaced apart wall extensions oriented in a direction that that guides the plunger body in the internal space.

13. The drive assembly of claim 11, wherein the plunger body comprises:

a lower prong received in the recess of the control member; and a cross member, and wherein the upper prongs extend from the cross member, the upper prongs including a first upper prong and a second upper prong spaced apart from the first upper prong.

14. The drive assembly of claim 13, wherein the at least one bias member is configured to apply a bias force on at least one of the first upper prong and the second upper prong.

15. The drive assembly of claim 13, wherein the rear face of the pawl body includes a rib having a concave cross-section, the rib operable to maintain an alignment of the first upper prong and the second upper prong on the rear face of the pawl body.

16. The drive assembly of claim 15, wherein the rib defines:

a first recessed surface of the rear face of the pawl body that is engaged by the first upper prong, and a second recessed surface of the rear face of the pawl body that is engaged by the second upper prong.

17. The drive assembly of claim 10, wherein the pawl body includes a sidewall having a linear outer peripheral surface configured to engage the ratchet head in a manner that prevents radial movement of the pawl body relative to the ratchet head during a ratcheting operation.

18. The drive assembly of claim 17, wherein the linear outer peripheral surface is configured to engage the ratchet head in a manner that facilitates linear movement of the pawl body relative to the ratchet head to thereby maintain the operational engagement of the external pawl teeth with the external gear teeth during the ratcheting operation.

* * * * *